United States Patent [19]
Robinson

[11] Patent Number: 5,393,317
[45] Date of Patent: Feb. 28, 1995

[54] METHOD AND APPARATUS FOR PRODUCING ORGANIC BASED FERTILIZER IN CONTINUOUS PROCESS

[75] Inventor: Elmo C. Robinson, Paragonah, Utah

[73] Assignee: Reland Industries, Inc., Paragonah, Utah

[21] Appl. No.: 750,769

[22] Filed: Aug. 22, 1991

Related U.S. Application Data

[63] Continuation of Ser. No. 432,565, Nov. 6, 1989, abandoned.

[51] Int. Cl.⁶ ............................................. C05F 13/00
[52] U.S. Cl. ................................ 71/12; 71/13; 71/15; 71/21; 71/23; 71/24; 71/25; 71/901
[58] Field of Search .................... 71/9, 11, 13, 12, 15, 71/21, 23-25, 901

[56] References Cited

U.S. PATENT DOCUMENTS

| | | | |
|---|---|---|---|
| 3,050,383 | 8/1962 | Wilson | 71/11 |
| 3,929,446 | 12/1975 | Trocino | 71/23 |
| 3,942,970 | 3/1976 | O'Donnell | 71/12 |
| 3,966,450 | 6/1976 | O'Neill et al. | 71/15 |
| 4,743,287 | 5/1988 | Robinson | 71/12 |

FOREIGN PATENT DOCUMENTS 896160 8/1989 South Africa .

Primary Examiner—Ferris Lander
Attorney, Agent, or Firm—David B. Smith

[57] ABSTRACT

A method and apparatus for making organic based fertilizer, the method including mixing organic material with phosphate, potash, or other inorganics and water if necessary. Acid is mixed with the organic and inorganic material mixture and the resulting mixture is permitted to cure for a sufficient period of time to allow the acid to chemically break down the material of the mixture. A first quantity of ammonia is then added to the mixture, and a second quantity of ammonia is added to the mixture to produce the finished fertilizer product. Quantities of the various ingredients are adjusted to provide a fertilizer that has a desired percentage make-up of the major fertilizer elements for a specific crop.

13 Claims, 2 Drawing Sheets

METHOD AND APPARATUS FOR PRODUCING ORGANIC BASED FERTILIZER IN CONTINUOUS PROCESS

This application is a continuation application of my earlier application Ser. No. 07/432,565, filed Nov. 6, 1989, and now abandoned.

FIELD OF THE INVENTION

This invention relates to fertilizers and more particularly to methods and apparatus for producing organic based fertilizer.

BACKGROUND PRIOR ART

Humic acids comprise various organic acids obtained from humate, a complex variable material resulting from partial decomposition over time of plant or animal matter and forming the organic portion of soil. The natural process of forming humate involves the biological breakdown of organic materials over extended periods of time to form organic colloids and humic acids. During this natural process, various available plant nutrients are attached to the humic acid molecules and absorbed into the organic colloids to form complex molecular clusters of humic acids and humic salts of plant nutrients. The resulting fertilizer is stable and efficient in providing nutrients to the plant and is substantially more stable than common chemical fertilizer forms, but the formation of naturally forming humic acid fertilizers takes long periods of time for natural production.

Until approximately the turn of the century, waste organic materials were used extensively as a primary nitrogen source of fertilizers. Today, even though waste organic materials such as agriculture wastes, agroindustrial processing wastes, and solid and liquid municipal waste are available in great quantities, such materials represent a small fraction of the total fertilizer market, with chemical fertilizers furnishing the majority of the fertilizer demand, primarily because no commercially viable method and apparatus have been developed for economically converting these waste organic materials to useable form as fertilizer having a high nitrogen content and providing controlled release of nutrients for plant growth.

Combining treated organic waste with inorganic materials to form a useful fertilizer is described in applicant's U.S. Pat. No. 4,743,287. Other prior art methods for making fertilizer are described in U.S. Pat. No. 3,050,383 to Wilson; U.S. Pat. No. 3,966,450 to O'Neil; U.S. Pat. No. 3,929,446 to Trocino; and U.S. Pat. No. 3,942,970 to O'Donnell.

The method for making fertilizer described in applicant's U.S. Pat. No. 4,743,287 includes the use of a pressure reactor vessel. This pressure reactor vessel can be expensive to manufacture and maintain operational and it is difficult to maintain pressure seals where the process material enters and exits the pressure vessel.

In other methods for making organic material based fertilizer, applicant has employed a process wherein a mixture of organic material and inorganics including phosphate, potash and trace minerals were placed in a mixer and a quantity of sulfuric acid was added to that mixture. A forty minute curing step followed the addition of acid. The cured mixture was then returned to the mixer wherein ammonia was added in sufficient quantity to produce a fertilizer of the desired pH. This process proved commercially impractical because it resulted in the generation of large quantities of fumes and heat during the addition of ammonia to the mixture, resulting inefficient use of the ammonia and generation of volatile fumes.

SUMMARY OF THE INVENTION

The method and apparatus embodying the invention provide for mixing organic materials, minerals, and inorganic chemicals to form organic based humic acid fertilizers, and wherein the process of forming the fertilizer is accomplished in a relatively short period of time compared to the time otherwise required for the natural process of forming humic fertilizer and wherein the organic based fertilizer provides a balanced, slow release of nutrients which cannot be achieved with common chemically produced inorganic or chemical fertilizers.

More particularly, the invention provides an improved and efficient method and apparatus for making organic based fertilizer, the method of the invention including selecting at least one organic material and mixing with this organic material measured quantities of nitrogen, phosphate, potash, sulfur and water if necessary. Subsequently, acid is mixed with the organic and inorganic material mixture and the resulting mixture is permitted to cure for a sufficient period of time to allow the acid to chemically break down the material of the mixture. Then a first quantity of ammonia is added to the mixture. A second quantity of ammonia is then added to the mixture to produce the finished fertilizer product. Quantities of the various ingredients are adjusted to provide a fertilizer that has a desired percentage make-up of the major fertilizer elements for a specific crop.

In a preferred form of the invention the organic material comprises at least 30% by dry weight of the finished product for granular production and 1–25% by dry weight of the finished product for slurry production. Measured amounts of the inorganic materials are mixed with the organic materials and the moisture content is adjusted, if required, either by adding water to the mixture or by dewatering the organics to obtain 12–40% moisture content by weight for a granular product. Similar adjustments to moisture content are made when the finished product is to be a slurry to obtain a moisture content of from 50–90%.

A sufficient quantity of acid, usually sulfuric or phosphoric acid, is then added in a downstream point in the mixing vessel to obtain a drastic change in pH, usually to a level of approximately 0.5 to 1.0 to provide for chemical break down of the organic material. The material is then allowed to cure for a sufficient period of time to allow the acid to react chemically with the organic material and inorganic materials. While the chemical reaction of the acid with the organic and inorganic material is not fully understood, it is believed that this chemical reaction results in the formation of humic acids and colloids. In one preferred embodiment of the invention, wherein a granular fertilizer is produced, a sufficient first quantity of base material, such as aqueous or anhydrous ammonia, is then added and blended with the cured mixture to raise the pH of that material to a pH level above that level obtained by the addition of acid and below the desired finished product pH level. This mixture may then be cooled by exposing the blended mixture to air or by the addition of an oxygen containing gas. A second quantity of base material is then added and blended into the mixture to raise the pH to the desired level of the finished product.

One principal feature of the invention is the provision of the step of curing the mixed material, following the addition of acid to the organic and inorganic material mixture, to enhance the chemical breakdown of organic materials and improved formation of colloids prior to the first dosage of ammonia. The curing step allows the acid to further penetrate the organic materials. This penetration accelerates the chemical breakdown and provides for more efficient use of the acid.

Another feature of applicant's invention in the formation of the granular product is the provision of a two step process of addition of base material to the mixture and the provision of the steps of curing, aeration or cooling of the process material prior to application of the second quantity of base material. An advantage of cooling the mixture is that it reduces the vaporization of the added base material and provides more effective utilization of the base material. Without this cooling step, considerable vaporization of the base material results, unless there is pressurized containment and treatment of the vaporized fumes, and such containment is difficult to achieve. While it is not fully understood, the effect of two or more curing steps while adding dosages of base improves utilization of the base material and bonding of the base material to the mixture.

It is a primary object of the invention to provide a process for producing an organic based fertilizer having improved stability and efficiency by combining soluable salt-based fertilizers with an organic material.

Another object of the invention is to provide a fertilizer manufactured by combining organic materials, inorganic materials and nutrients, and a nitrogen base whereby the resulting organic based fertilizer product will have a desirable chemical make-up, provides for controlled long term release of nutrients for plant growth.

These and other objects and features of the process of the invention will become more fully apparent from the following detailed description in which the method and apparatus for practicing the invention will be described in detail.

DETAILED DESCRIPTION OF THE PREFERRED EMBODIMENTS

Figure 1:
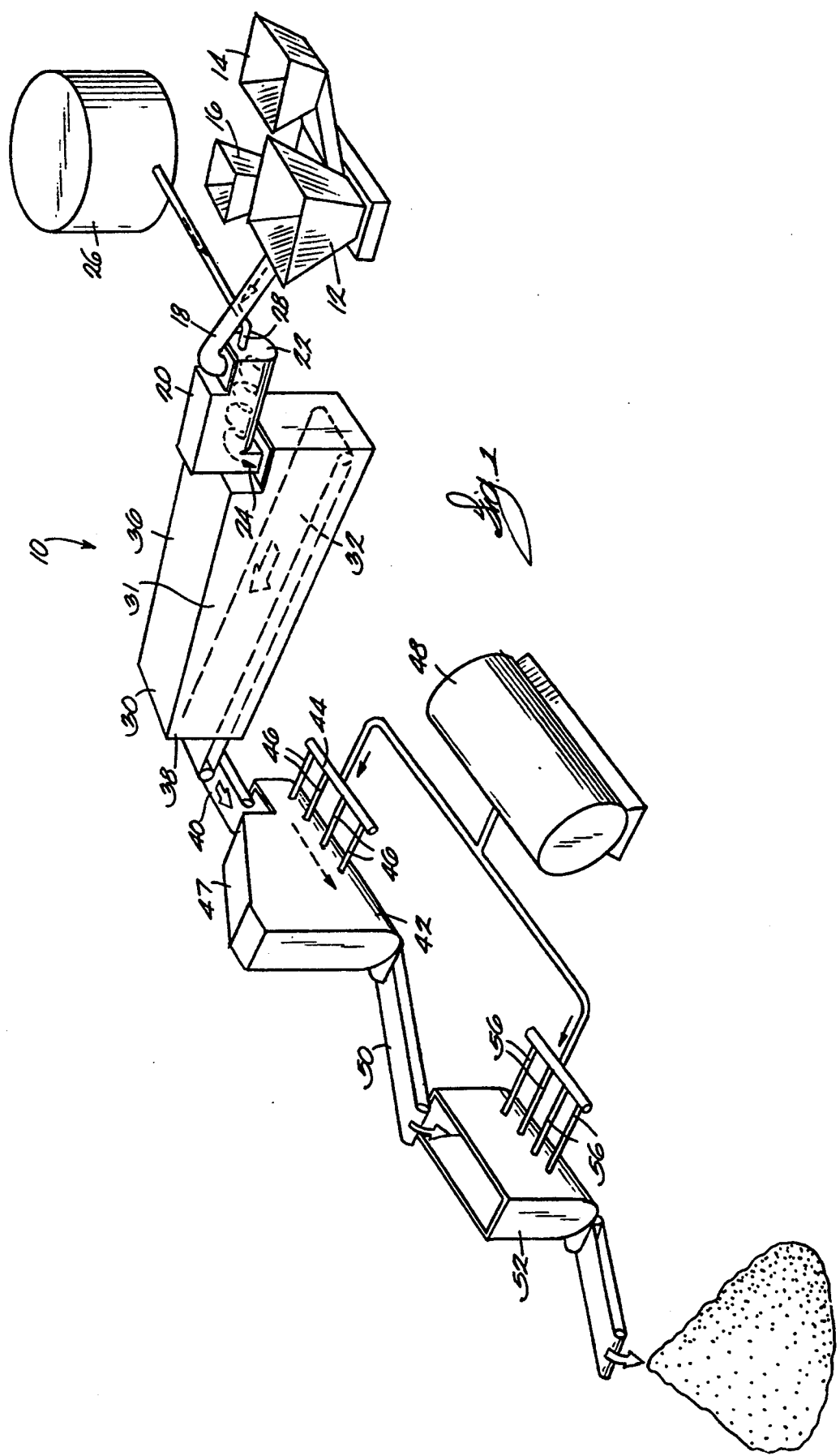
FIG. 1 is a perspective view of apparatus embodying the invention and for practicing the process of the invention to obtain a granular fertilizer product.
Figure 2:
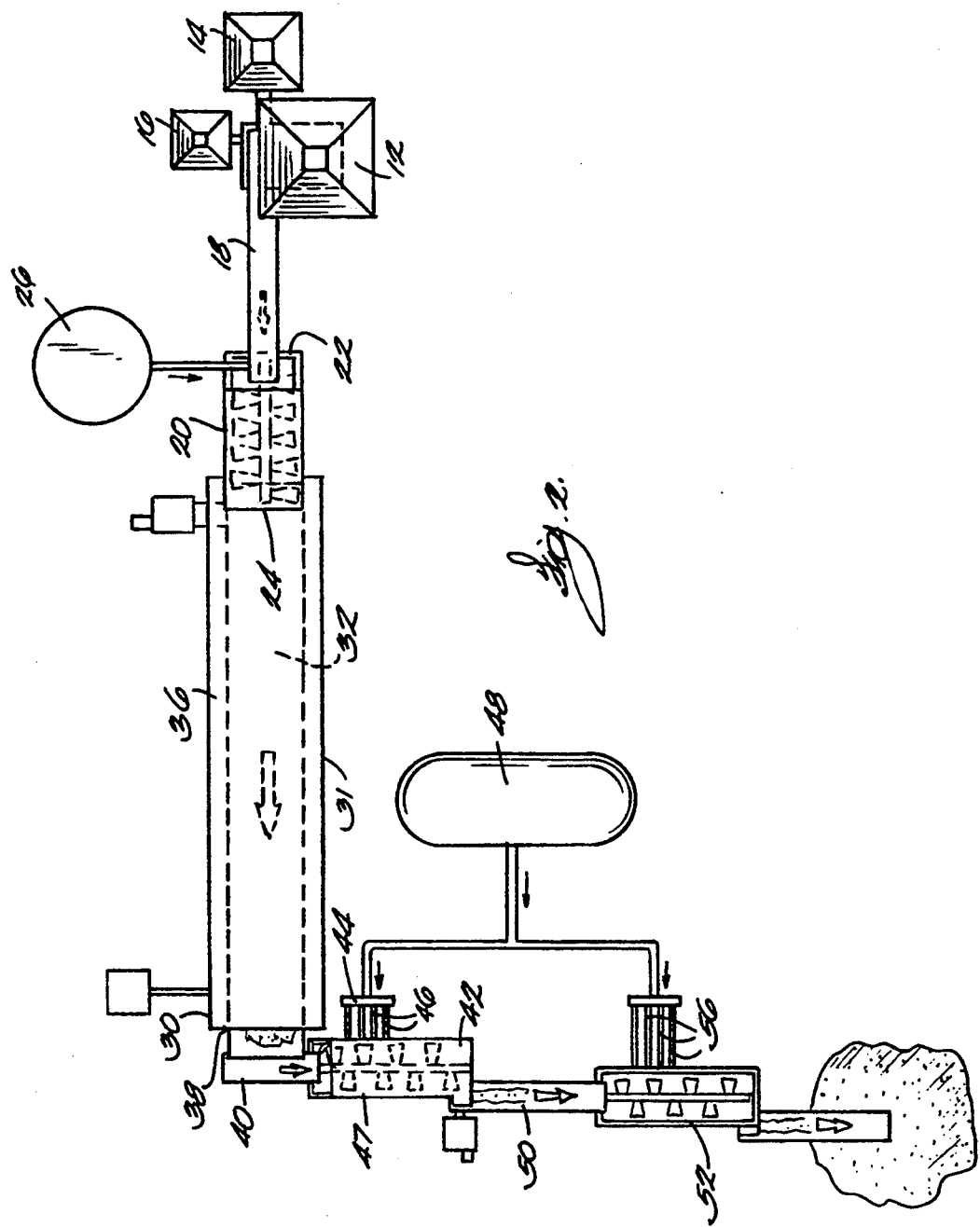
FIG. 2 is a plan view of the apparatus illustrated in FIG. 1.

FIG. 1 illustrates schematically an apparatus 10 embodying the invention and for producing a granular humic fertilizer product. The apparatus includes a hopper 12 for containing organic material. The selected organic material could be solid or liquid, but in one preferred form of the invention for producing a granular product, the organic material is preconditioned such as by dewatering, composting, digestion, mechanical grinding or screening such that it is in a moist comminuted form. For purposes of example, but not for limitation, the waste organic material in the hopper 12 can comprise livestock and poultry manure, sewage sludge, separated garbage, cotton-gin trash, fruit cannery waste, vegetable cannery waste, nut cannery waste, wood and paper pulp waste, spent mushroom compost, methane and alcohol solid wastes, lignite, leonardite, humate or coal. The apparatus further includes a second hopper 14 adapted to contain inorganic materials such as rock phosphate, and a third hopper 16 is provided for containing potash and other inorganic materials or minerals. Selected quantities of material from the hoppers 12, 14 and 16 are deposited into a conveyor 18 and conveyed into a mixer 20. While the mixer 20 could have other configurations, in one embodiment of the invention it can comprise a continuous paddle type mixer, of the type commonly used in mixing agricultural feed, or grain, and having an inlet end 22 for continuously receiving material from the hoppers 12, 14 and 16 and a discharge end 24. The material is conveyed to the mixer 20 from the hoppers 12, 14 and 16 in measured quantities, waste organic materials and inorganic materials being in amounts calculated to produce an end fertilizer that has a desired chemical make-up taking into account the nutrient content of the acid and base subsequently used in the process as will be described below. A measured amount of water may also be added to the mixture in the mixer 20 unless otherwise available from moisture already present in the materials.

A sufficient amount of acid, for example sulfuric or phosphoric acid, from an acid tank 26 is then injected or sprayed through nozzles 28 in the mixer into the mixture and thoroughly mixed by paddles in the mixer with the other materials to provide for chemical breakdown of the organic material. The sulfuric or phosphoric acid produces a chemical reaction which elevates the temperature of the mixture and drastically reduces the pH of the organic material to a level of preferably 0.5 pH. The paddles of the paddle type mixer cause the material in the mixer to be conveyed from the inlet end 22 of the mixer toward the discharge end 24 during the mixing process, and the mixture is deposited from the discharge end 24 of the mixer 20 into one end of an elongated curing bin 30 including sidewalls 31 and a slowly moving belt 32 forming the bottom or floor of the bin. As the low pH material in the curing bin 30 moves along the length of the curing bin on the slow moving belt, the material cures and cools. In one form of the invention the curing bin can have a length and the belt is moved at a rate such that the mixture will be held in the curing bin for 20 to 60 minutes. While not fully understood, curing of the mixture appears to facilitate penetration of the acid into the organics and provides for the chemical breakdown of the organics. It will be appreciated, because the material in the acid mixer 20 and in the curing bin 30 is highly acidic, the components of the mixer and the curing bin must be comprised of corrosion resistant materials such as stainless steel in order to withstand the corrosive effects of the low pH mixture. In the illustrated arrangement the curing bin is covered by a top 36 to control emission of fumes from the curing bin.

At the discharge end 38 of the curing bin 30, the cured mixture is deposited onto a belt conveyor 40 and then deposited by the conveyor 40 into another hooded paddle type mixer 42. The mixer 42 includes a manifold 44 having a plurality of injection nozzles 46 for injecting a base material into the mixture contained in the mixer 42. While the base material could be other materials, in one form of the invention it can comprise aqueous or anhydrous ammonia. A first quantity of ammonia contained in the tank 48 is injected through the nozzles 46 into the material in the mixer 42 and the mixture is stirred by the paddles of the mixer. In a preferred form of the invention a sufficient quantity of ammonia is injected into the mixture to raise the pH level of the mixture to an intermediate level lower than the pH level of the final fertilizer product to be produced. In one form of the invention the mixer 42 can be closed at the top by a hood 47, the hood 47 controlling emission of fumes generated by the chemical mixing of the acid material and base and providing for condensation of any fumes and reintroduction of the condensation into the mixture.

The material from the mixer is then deposited onto a conveyor belt 50 and is conveyed to a second mixer 52 which, like mixer 42, can comprise a paddle type mixer. The belt conveyor 50 can be exposed to the atmosphere such that as the mixture from the discharge end of the mixer 42 is conveyed to the second mixer 52, the material is exposed to the atmosphere and is cooled and aerated.

As the material moves through the second mixer 52, additional ammonia from the tank 48 is injected through nozzles 56 in the mixer 52 into the mixture to further raise the pH of the mixture to that desired in the final fertilizer product.

While the operation of the two step addition of the base material to the mixture and the effect of cooling and aerating the mixture between the mixers 42 and 52 is not fully understood, the two or more steps of adding base material and the intermediate curing improves the utilization of the base material and bonding of the base material to the mixture. While curing of the mixture can be accomplished by exposing the blended mixture to air on the conveyor, oxygen containing gas could also be injected into the mixture to allow for cooling and aeration of the mixture or material between the steps of adding base to the mixture.

In formation of the fertilizer it is believed that it is the drastic pH change to the mix of organic and inorganic materials that brings about the desired chemical breakdown of the organic material to form humic acid. The curing, cooling and aeration of the mixture after the initial mixing of acid improves penetration of the acid into the organic material and chemical breakdown of the organic material. It is believed that the inorganic elements form molecular clusters surrounding the larger humic acid molecules and saturate the organic colloids to produce a humic acid, organic based fertilizer that is similar to those found naturally in highly fertile soils.

If the material is to be processed to the form of a dry fertilizer, it has been found that is desirable that the material to emerge from the final mixer have approximately 20% moisture content by weight which can be varied from 12–40% depending on the organic material selected. At this moisture content, the material can be easily formed into particles and then conveyed into storage.

PROCESS ILLUSTRATION

Following is an illustration of the process of the present invention using a select organic material to produce a granular end fertilizer having the major element constituents by weight of 5-5-0-6 (N-P-K-S). The organic material was spent mushroom compost having 53.9% dry weight of the finished fertilizer with 1.5—1.5–0.05 N-P-K analysis. Rock phosphate was mixed with the organic material, this rock phosphate comprising ground rock with 31.5% $P_2O_5$, and the rock phosphate comprising 15.9% dry weight of the finished fertilizer. Sulfuric acid was mixed with organic and inorganic materials, the sulfuric acid being in the amount of 24% of the dry weight of the finished fertilizer. Anhydrous ammonia comprising 6.3% dry weight of the finished fertilizer was added to the acidic mixture.

Initially the organics and the phosphate were mixed together with enough water to bring the mixture to 25% moisture by weight. The moisture content can vary between 12% to 40% to appropriately adjust the granulation particle sizes and for other types of organics. Other dry materials such as potash, trace materials, or nitrogen were added as required. The rate of flow of the pre-mixed solids was determined and the sulfuric acid and ammonia injection rates were adjusted accordingly. More particularly, the pre-mix flow was at 233 lbs. (dry weight) per minute, and the sulfuric acid injection in first mixer was set at 80 lbs./min. Following the injection of acid into the mixture, the mixture was cured in the curing bin for 40 to 60 minutes. The ammonia is injected into the ammonia mixers at 20.7 lbs./min.

As the mixed organic material and rock phosphate flows through the first mixer, it is completely mixed with the sulfuric acid. This acidified mixture may reach a temperature of 100 to 230 degrees fahrenheit, starting the chemical breakdown process of the organic or inorganic materials. These materials are then cured in the curing bin for 40–60 minutes. Ammonia is then added in two steps to the cured acidic mixture. Each step consists of ammonia addition, with the materials being thoroughly mixed; then curing, aeration and cooling to complete the step. The temperature increases to between 160 and 220 degrees fahrenheit. The increased temperature and chemical reaction, it is believed completes the breakdown of the ingredients forming a completely new molecular structure. The individual elements form molecular clusters around the larger humic and humic acid molecules and saturate the organic colloids, which are similar to those found naturally in highly fertile soils.

The mixture produced as a completed fertilizer can be processed further if required to meet the finished product consistency, such as by processing through a granulator to obtain a desired particle size.

What is claimed is:

1. A method for producing an organic based humic acid fertilizer containing a predetermined amount of an available inorganic material selected from the group consisting of nitrogen, phosphate, potash, sulfur, and mixtures thereof and having a desired final pH level in the finished fertilizer product, said method comprising the steps of:

(a) mixing with an organic material selected from the group consisting of livestock and poultry manure, sewage sludge, separated garbage, cotton gin trash, fruit cannery waste, vegetable cannery waste, nut cannery waste, wood and paper pulp waste, spent mushroom compost, methane and alcohol solid wastes, lignite, leonardite, humate, coal and mixtures thereof, a sufficient amount of said inorganic material to provide said predetermined amount of said inorganic material in the fertilizer product;

(b) blending with the mixture produced in step (a) a sufficient amount of acid to substantially reduce the pH thereof and to cause chemical breakdown of said organic material;

(c) allowing the blended mixture to stand for at least 20 minutes;

(d) blending with the mixture produced in step (c) a sufficient amount of a base material to raise the pH thereof to a level which is intermediate to a said final pH level; and (e) blending with the mixture produced in step (d) additional base material to raise the pH thereof to said final pH level.

2. A method as set forth in claim 1 wherein the mixture produced in step (d) is cooled and aerated by contacting with an oxygen-containing gas prior to step (e).

3. A method as set forth in claim 1 wherein the amount of said organic material in the finished fertilizer product is at least about 30 weight %, based on the total dry solids weight of the finished fertilizer product.

4. A method as set forth in claim 1 wherein the blended mixture reaches a temperature of about 100° to about 250° F. during step (c).

5. A method set forth in claim 1 wherein during step (b) a sufficient of acid is added to reduce the pH of the mixture to be within the range of about 1.0 to about 0.5.

6. A method set forth in claim 1 wherein the pH of the mixture is increased to be within the range of about 2 to about 4 in step (d) and said desired final pH level is within the range of about 4 to about 8.

7. A method set forth in claim 1 wherein the moisture content of the mixture of said organic material and said inorganic material produced in step (a) is adjusted to be within the range of about 12 to about 40 weight, % based on the total weight of the mixture, by adding water to the mixture or dewatering said organic material.

8. A method set forth in claim 1 wherein steps (b), (c), (d) and (e) are carried out at atmospheric pressure.

9. A method set forth in claim 1 wherein the moisture content of the mixture of said organic material and said inorganic material produced in step (a) is adjusted to be within the range of about 12 to about 40 weight %, based on the total weight of the mixture, by adding water to the mixture or dewatering said organic material.

10. A method according to claim 1 wherein the blended mixture is allowed to stand in step (c) for about 20 to about 60 minutes.

11. A method of producing an organic based humic acid fertilizer containing a predetermined amount of an inorganic material selected from the group consisting of nitrogen, phosphates, potash, sulfur, and mixtures thereof and having a desired final pH level in the finished fertilizer product, said method comprising the steps of:

(a) mixing with an organic material selected from the group consisting of livestock and poultry manure, sewage sludge, separated garbage, cotton gin trash, fruit cannery waste, vegetable cannery waste, nut cannery waste, wood and paper pulp waste, spent mushroom compost, methane and alcohol solid wastes, lignite, leonardite, humate, coal and mixture thereof, a sufficient amount of said inorganic material to provide said predetermined amount of said inorganic material in the fertilizer product;

(b) blending the mixture produced in step (a) with a sufficient amount of an acid to substantially reduce the pH thereof and to cause chemical breakdown of said organic material;

(c) allowing the blended mixture to stand for at least 20 minutes;

(d) blending with the mixture produced in step (c) a sufficient amount of ammonia to raise the pH thereof to a level which is intermediate to said final pH level;

(e) cooling the mixture produced in step (d) by exposing the mixture to an oxygen-containing gas; and (f) blending with the cooled mixture a sufficient quantity of ammonia to raise the pH to said desired pH level.

12. The method set forth in claim 10 wherein during step (b) a sufficient amount of acid is added to reduce the pH of the mixture to be within the range of about 1.0 to about 0.5.

13. The method set forth in claim 12 wherein the pH of the mixture from step (c) is increased to be within the range of about 2 to about 4 in step (d) and said desired final pH level is within the range of about 4 to about 8.

* * * * *